United States Patent [19]
Mizuta

[11] Patent Number: 5,860,885
[45] Date of Patent: Jan. 19, 1999

[54] LUBRICATING STRUCTURE OF AUTOMATIC TRANSMISSION

[75] Inventor: Muneo Mizuta, Fuji, Japan

[73] Assignee: JATCO Corporation, Fuji, Japan

[21] Appl. No.: 797,262

[22] Filed: Feb. 7, 1997

[30] Foreign Application Priority Data

Feb. 7, 1996 [JP] Japan ..................................... 8-020810

[51] Int. Cl.[6] .............................. F16H 57/04; F16H 1/28
[52] U.S. Cl. .......................................... 475/116; 192/18 A
[58] Field of Search ......................... 192/18 A; 475/116, 475/311, 315, 314, 146

[56] References Cited

U.S. PATENT DOCUMENTS

| | | | |
|---|---|---|---|
| 3,069,929 | 12/1962 | Hansen ............................... | 192/18 A X |
| 3,088,552 | 5/1963 | Christenson et al. ............. | 192/18 A X |
| 3,688,601 | 9/1972 | Dach .................................. | 192/18 A X |
| 3,744,606 | 7/1973 | Bucksch ............................. | 192/18 A X |
| 3,747,727 | 7/1973 | Dach et al. ........................ | 192/18 A |
| 4,966,264 | 10/1990 | Hayakawa et al. ................. | 475/311 X |
| 5,462,147 | 10/1995 | Sherman ............................. | 192/18 A |

FOREIGN PATENT DOCUMENTS 62-288753  12/1987  Japan .

Primary Examiner—Rodney H. Bonck
Attorney, Agent, or Firm—Jacobson, Price, Holman & Stern, PLLC

[57] ABSTRACT

A lubricating structure of an automatic transmission is provided which is capable of realizing sufficient cooling lubrication with lubricating oil, utilizing a given space efficiently, and avoiding the possibility of an increase in the weight of assembly parts by checking an increase in the number of the assembly parts. The rotational direction of a front planetary gear device (46) and the like is changed by engagement or disengagement of each of multiplate clutch plates (35, 43) of a plurality of multiplate clutch devices (33, 40), and thereby the transmission state of driving force is shifted. A 2-4 brake clutch (33) of the multiplate clutch devices (33, 40) is engaged in two forward gears and is disengaged in a forward gear between the two forward gears. A reverse clutch (40) of the multiplate clutch devices (33, 40) is disposed substantially in the same position as that of the 2-4 brake clutch (33) in the axial direction and outside of the 2-4 brake clutch (33) in the radius direction. The reverse clutch (40) uses a clutch drum (36) of the 2-4 brake clutch (33) as a clutch hub.

1 Claim, 6 Drawing Sheets

FIG. 3

| | R/C | H/C | L/C | 2-4/B | L&R/B |
|---|---|---|---|---|---|
| FIRST SPEED | | | ○ | | ○ |
| SECOND SPEED | | | ○ | ○ | |
| THIRD SPEED | | ○ | ○ | | |
| FOURTH SPEED | | ○ | | ○ | |
| REVERSE | ○ | | | | ○ |

DRIVE RANGE

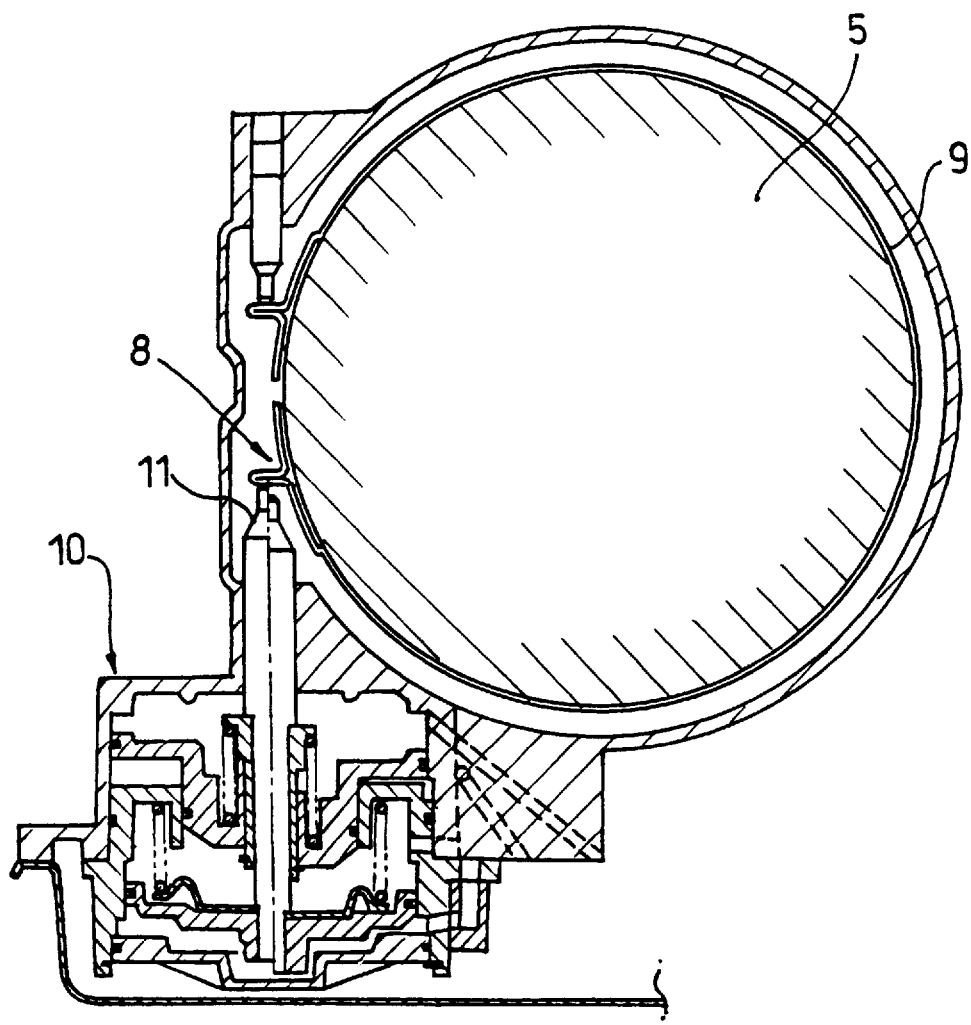

LUBRICATING STRUCTURE OF AUTOMATIC TRANSMISSION

BACKGROUND OF THE INVENTION

1. Field of the Invention

This invention relates to a lubricating structure of an automatic transmission principally used for controlling the transmission of driving force in a vehicle.

2. Description of the Prior Art

As shown in FIGS. 4 to 6, there has been known a conventional lubricating structure of an automatic transmission as disclosed in, for example, Japanese Patent Application Early Laid-Open Publication No. Sho 62-288753. This type of conventional automatic transmission has a transmission gear device which consists of four forward gears and one reverse gear by which gear shifting is performed.

Referring to FIGS. 4 to 6, a cylindrical drum 5 is rotatably connected to a front sun gear 4 by the medium of a connecting shell 3 around an input shaft 1b in a case 2 of an automatic transmission 1.

In the drum 5, a reverse clutch device 6 and a high clutch device 7 are disposed parallel to the input shaft 1b. The reverse clutch device 6 and the high clutch device 7 are multiplate clutch devices and have a function of engaging or disengaging a multiplate clutch plate by the shoving pressure of a clutch piston so as to shift a transmission state of driving force. A clutch drum 6a of the reverse clutch device 6 is connected to the drum 5 and is rotated by the rotation of the drum 5.

A brake band 9 of a band brake device 8 is attached to the circumferential surface of the drum 5. The rotation of the drum 5 is controlled by a piston 11 of a band servo device 10 shown in FIG. 6.

In the circumferential surface of the drum 5, there is formed an oil hole 15 through which lubricating oil is supplied to a space defined between sliding surfaces of the brake band 9 and the drum 5.

In the rear of the connecting shell 3, a front planetary gear device 12 and a rear planetary gear device 13 are disposed parallel to the input shaft 1b.

A front planet carrier 14 in the front planetary gear device 12 is linked to a high clutch hub 16 in the high clutch device 7 through a cylindrical sleeve portion 17.

A rear planet carrier 18 in the rear planetary gear device 13 is linked to a front internal gear 19 in the front planetary gear device 12 and is also linked to an output shaft 20 disposed coaxially with the input shaft 1b.

For example, in the third forward gear, the high clutch device 7 is engaged whereas the band brake device 8 is disengaged. On the other hand, in the fourth forward gear, the band brake device 8 as well as the high clutch device 7 is engaged, and the drum 5 is then fixed to the transmission case 2 and thereby the front sun gear 4 is also fixed thereto.

The rotational driving force inputted by the input shaft 1b is transmitted from the high clutch device 7 to the front planet carrier 14 via the high clutch hub 16, and thereby a front planetary gear 21 is rotated around the front sun gear 4.

Accordingly, the rotation of the front internal gear 19 is accelerated, and thereby the output shaft 20 connected to the rear planet carrier 18 is rotated at a speed equal to or higher than the input shaft 1b.

Oil paths 22 and 23 are formed in the input shaft 1b and the high clutch hub 16, respectively. When the drum 5 is rotated, lubricating oil is supplied to the front planetary gear device 12 and the rear planetary gear device 13 via the oil paths 22 and 23, and is also supplied to the space defined between the sliding surfaces of the brake band 9 and the drum 5 through the oil hole 15 formed in a circumferential part of the drum 5 via the oil paths 22 and 23, the high clutch device 7, and the reverse clutch device 6.

However, in a lubricating structure of this type of automatic transmission, in the fourth forward gear, the band brake device 8, which is disposed outside of the high clutch device 7 and fixes the drum 5, is supplied with operating oil and is engaged at the same time that the high clutch device 7 is engaged.

Accordingly, the lubricating oil which has lubricated and cooled the high clutch device 7 via the oil paths 22 and 23 is discharged from the oil hole 15 and is supplied to the space between the sliding surfaces of the brake band 9 and the drum 5 without lowering its high temperature. Therefore, high cooling efficiency has not been obtained.

Besides, as mentioned above, the band brake device 8, which is disposed outside of the high clutch device 7 and fixes the drum 5, is supplied with operating oil and is engaged simultaneously with the engagement of the high clutch device 7. This has caused an increase in the quantity of operating oil. Moreover, since the band brake device 8 is disposed outside of the high clutch device 7, lubricating oil is dispersed when the drum 5 is rotated. This has made it difficult to supply a predetermined quantity of oil to the band brake device 8.

The band brake device 8 is engaged in the second forward gear and the fourth forward gear and is disengaged in the third forward gear. Thus, the engagement and disengagement for the gearshifting of the band brake device 8 are repeatedly carried out with high frequency of use even when ordinary acceleration is carried out (for example, when the gear is shifted in sequence of the first gear, the second gear, the third gear, and the fourth gear). Accordingly, there has been a fear that production costs may be raised because friction materials superior in heat-resisting property must be used for the sliding surfaces of the brake band 9 and the drum 5 if sufficient cooling cannot be expected.

As a result of disposing the band brake device 8 outside of the drum 5 as shown in FIG. 6, a given space cannot be utilized efficiently. Furthermore, the band brake device 8 is constructed of relatively large parts, such as the brake band 9, the band servo device 10, and the like. For this reason, an increase in the number of the assembly parts leads to a raise in production costs and to an increase in the weight of the assembly parts.

SUMMARY OF THE INVENTION

An object of the present invention is to provide a lubricating structure of an automatic transmission which is capable of realizing sufficient cooling lubrication with lubricating oil, utilizing a given space efficiently, and avoiding the possibility of an increase in the weight of assembly parts by checking a further increase in the number of the assembly parts.

The lubricating structure of the automatic transmission according to an aspect of the present invention is characterized in that multiplate clutch plates of a plurality of multiplate engaging elements are engaged to or disengaged from each other by means of pistons each of which presses the multiplate clutch plates in an axial direction and thereby the rotational direction of a planetary gear train is changed to change a transmission state of driving force. The lubricating structure further includes second multiplate friction engaging elements which are engaged to each other when conducting a backward movement. The second multiplate friction engaging elements are disposed substantially in the same position as a position of first multiplate engaging elements in the axial direction and are disposed outside of the first multiplate engaging elements in a radius direction.

According to the aforementioned lubricating structure of the automatic transmission, the first multiplate engaging elements which are engaged in two gears on a forward side and are disengaged on the forward side between the two gears, for example, with high frequency of use can be disposed in the vicinity of a rotational central axis. Accordingly, cooling lubrication with lubricating oil is performed in the first multiplate engaging elements.

After that, the lubricating oil which has sufficiently cooled the first multiplate engaging elements lubricates and cools the second multiplate friction engaging elements which are disposed substantially in the same position as the position of the first multiplate engaging elements in the axial direction and are disposed outside of the first multiplate engaging elements in the radius direction.

Therefore, greater cooling efficiency can be obtained because the first multiplate engaging elements used with higher frequency than the second multiplate friction engaging elements are first lubricated and cooled.

Preferably, the piston of the first multiplate engaging elements is a brake piston for shifting the transmission state of driving force so as to achieve four forward speeds and one reverse speed by engaging the multiplate clutch plates in the second forward gear and the fourth forward gear and disengaging them in the third forward gear.

According to the lubricating structure of the automatic transmission, the brake piston of the first multiplate engaging elements shifts the transmission state of driving force so as to realize four forward speeds and one reverse speed by engaging the multiplate clutch plates in the second forward gear and the fourth forward gear and disengaging them in the third forward gear.

For example, a clutch hub of the first multiplate engaging elements is fixed on the case side of an automatic transmission, and a driven plate of the multiplate clutch plates is disposed on the case side thereof, or a clutch drum is held rotatably by means of a supporting member which is fixed on the case side thereof. This arrangement enhances dispositional accuracy and, as a result, the amount of heat generated by rotational friction can be controlled.

Consequently, the efficiency of lubricating and cooling the first and second multiplate engaging elements can be further heightened and, in addition, the increase in the weight and the production costs can be checked.

Additionally, a multiplate brake device is constructed such that the brake piston thereof shifts the transmission state of driving force so as to achieve the four forward speeds and the one reverse speed by pressing the multiplate clutch plates in the axial direction and engaging the multiplate clutch plates in the second forward gear and the fourth forward gear and disengaging them in the third forward gear.

Therefore, the multiplate brake device can be compactly disposed inside of a second multiplate clutch device without a brake band or a servo device, such as a conventional band brake device, which is comparatively large.

Accordingly, a given space can be utilized efficiently.

Preferably, the clutch plates of the first multiplate engaging elements are disposed overlapping with the clutch plates of the second multiplate engaging elements in the axial direction.

According to this arrangement, since the clutch plates of the first multiplate engaging elements and the clutch plates of the second multiplate engaging elements are disposed overlapping with each other in the axial direction, the length of a lubricating apparatus of the automatic transmission in the axial direction can be shortened.

As a consequence, the given space can be utilized more efficiently.

BRIEF DESCRIPTION OF THE DRAWINGS

FIG. 3 is a table showing the engagement and disengagement at each gear of the lubricating structure of the automatic transmission according to the first embodiment of the present invention.

FIG. 6 is a partially enlarged sectional view of the lubricating structure of the conventional automatic transmission, taken along the line A—A of FIG. 5.

DETAILED DESCRIPTION OF THE EMBODIMENTS

A first embodiment of the present invention will be hereinafter described with reference to the accompanying drawings. In this embodiment, the same numerals are each given to the same constituent parts as those of a conventional automatic transmission.

Figure 1:
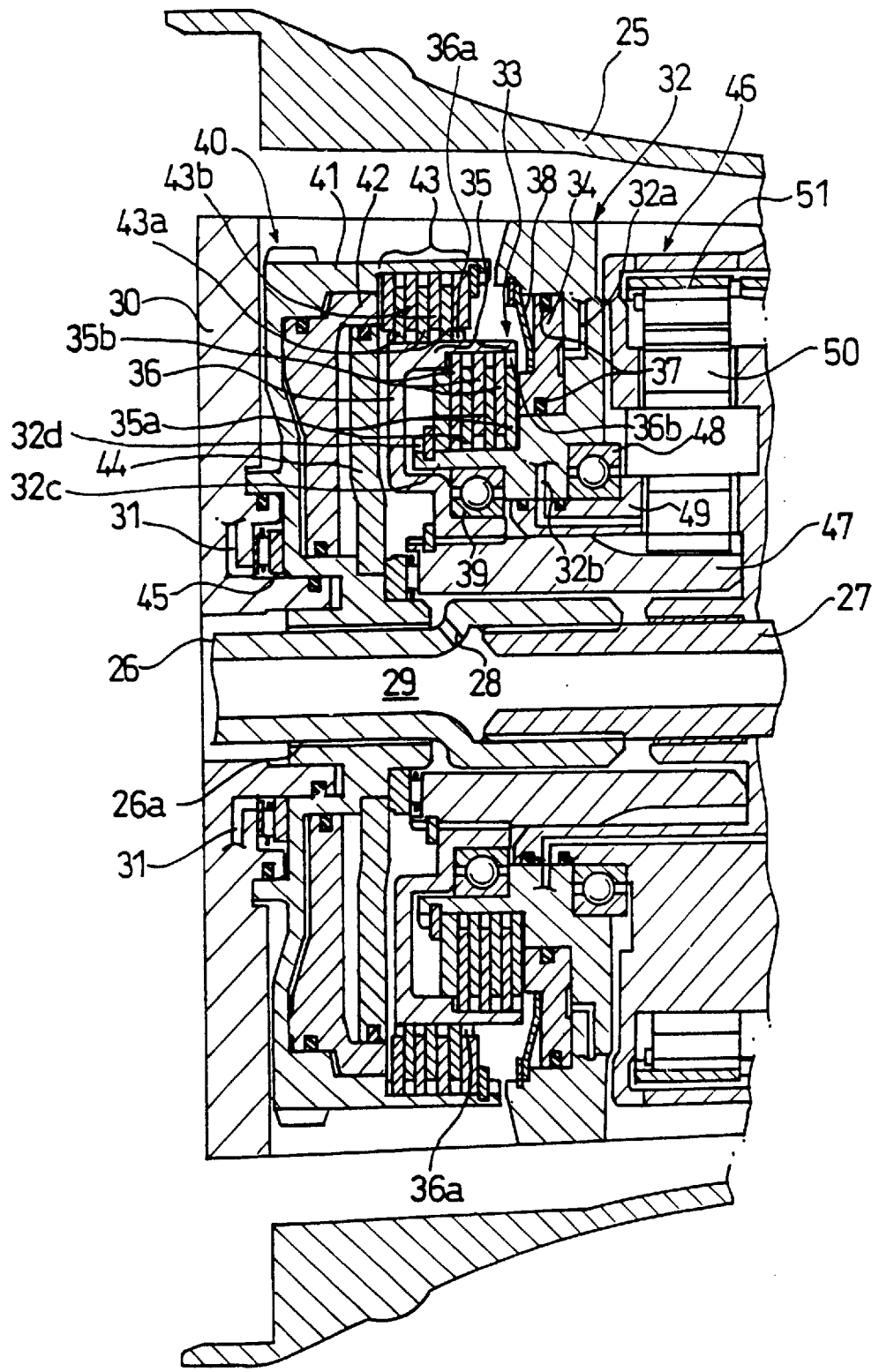
FIG. 1 is a sectional view of a lubricating structure of an automatic transmission according to a first embodiment of the present invention, taken along a rotational axis of the automatic transmission.
Figure 2:
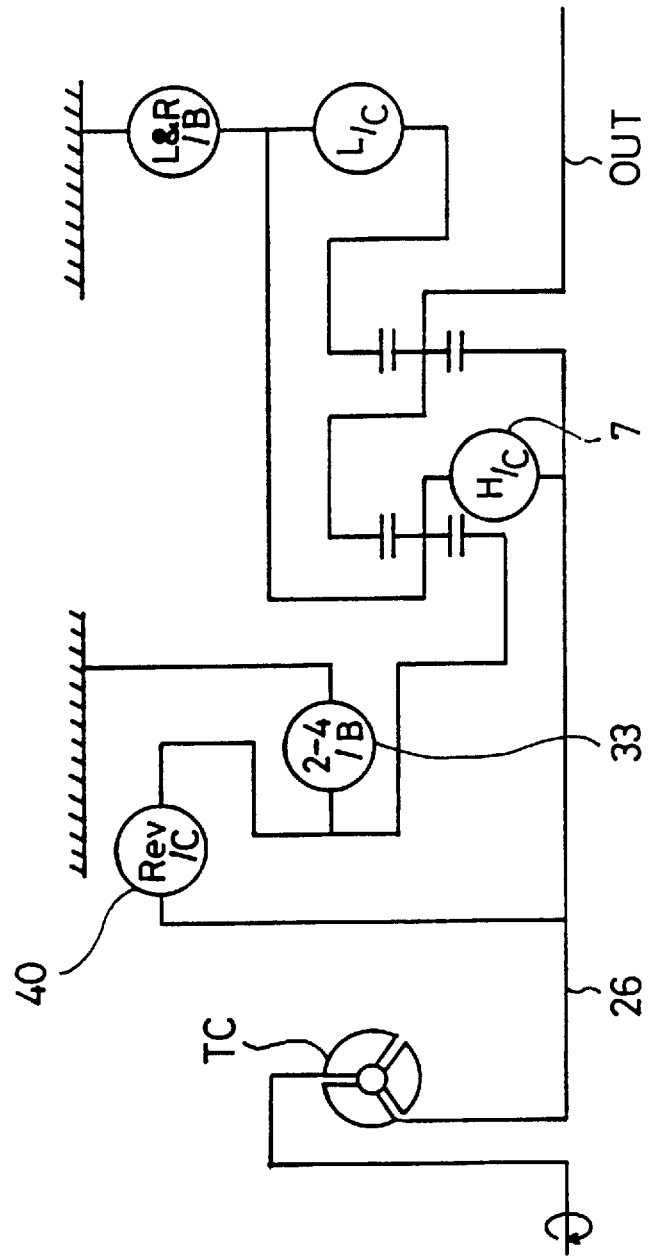
FIG. 2 is a skeleton diagram of the lubricating structure of the automatic transmission according to the first embodiment of the present invention.
Figure 4:
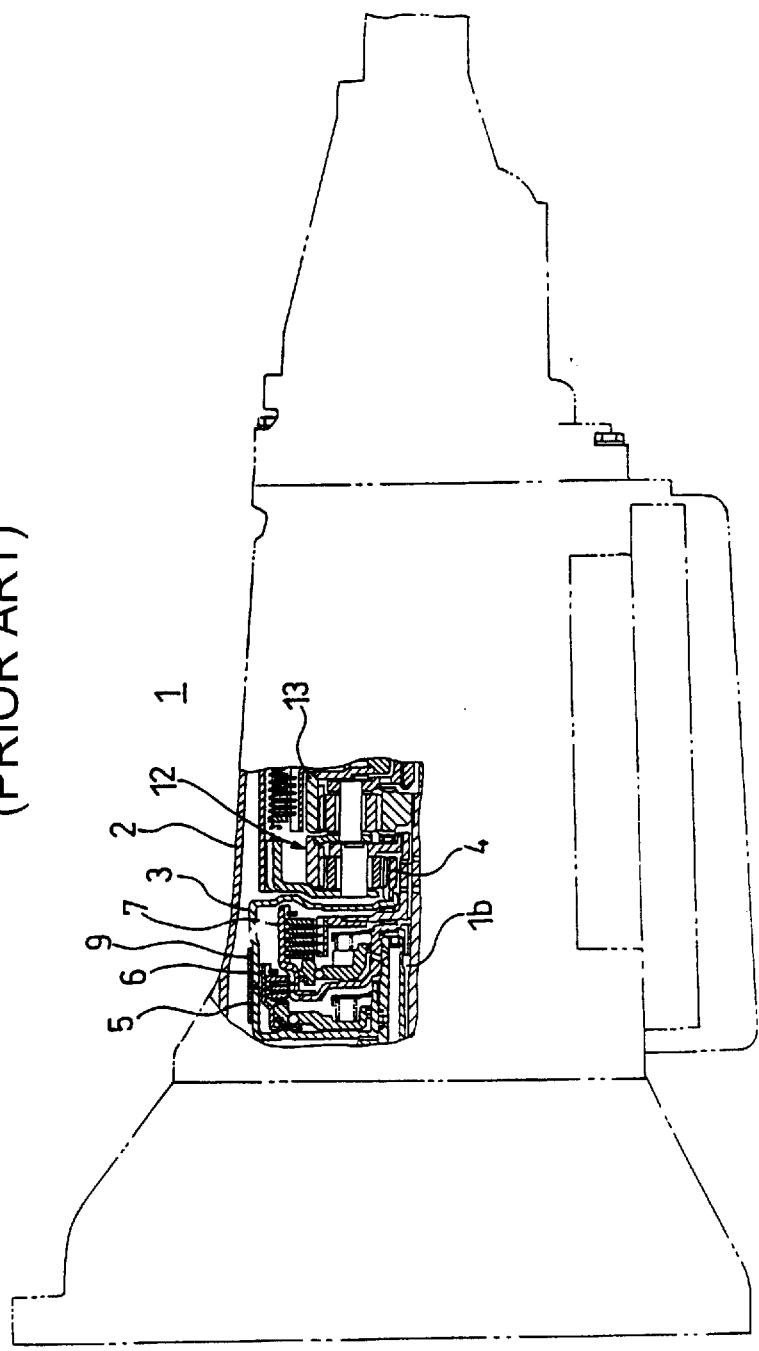
FIG. 4 is a sectional view of a lubricating structure of a conventional automatic transmission, taken along the rotational axis of the automatic transmission.
Figure 5:
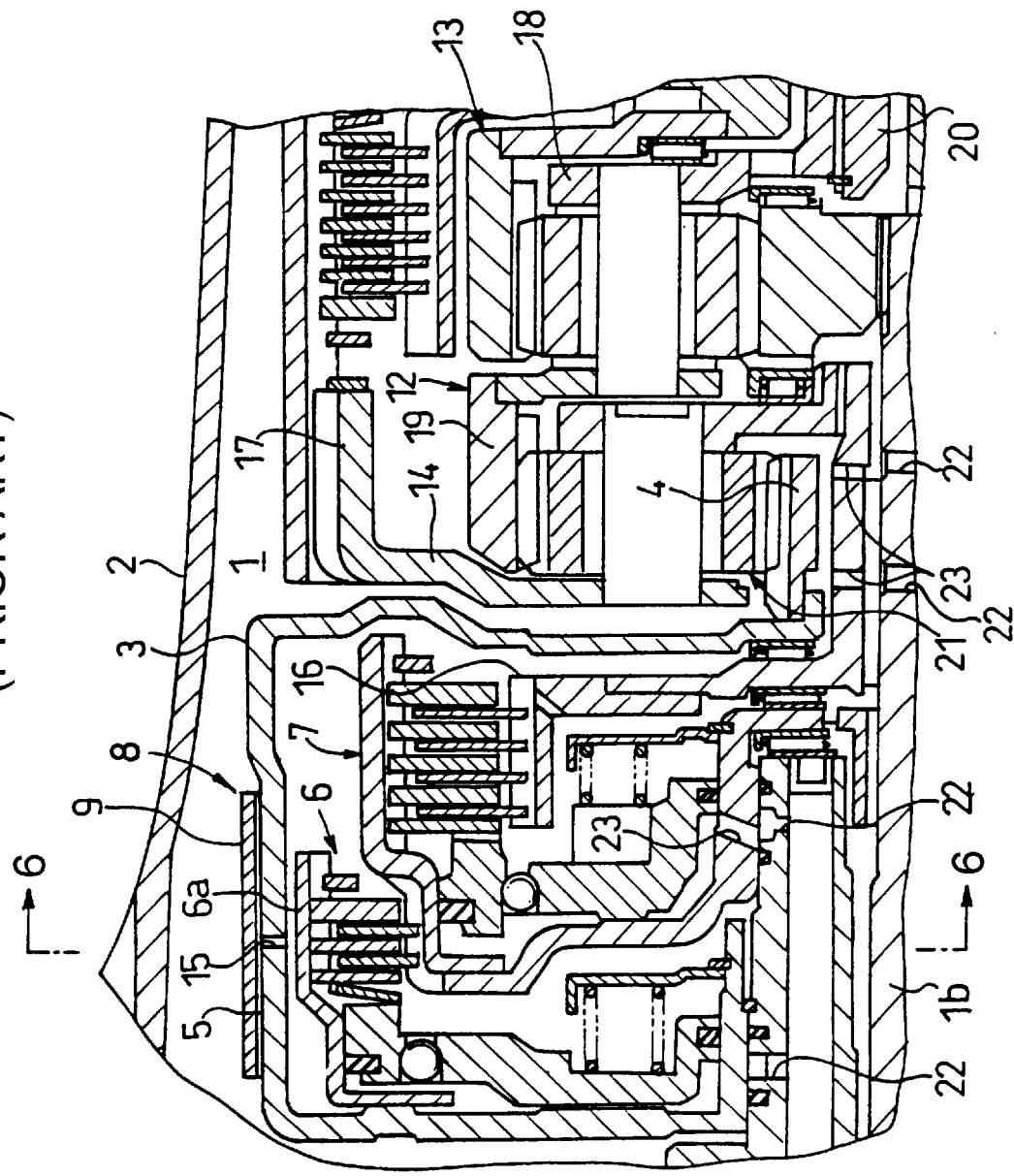
FIG. 5 is a partially enlarged sectional view of the lubricating structure of the conventional automatic transmission, taken along the rotational axis of the automatic transmission.

FIGS. 1 to 3 show a lubricating structure of an automatic transmission according to the first embodiment of the present invention, in which the rotational direction of a planetary gear device, mentioned later, is changed by engaging or disengaging each multiplate clutch plate of a plurality of multiplate clutch devices, and thereby a transmission state of driving force is shifted into any one of four forward speeds and one reverse speed.

In a case 25 of the automatic transmission, input shafts 26, 27 which are divided into two in the front and back directions are disposed simultaneously rotatably by uniting the rear end of the front-side input shaft 26 to the front end of the back-side input shaft 27 through a spline connection method.

In an enlarged part in diameter adjacent to the spline connection portion of the front-side input shaft 26, an oil hole 28 through which lubricating oil passes is formed such that the lubricating oil flows out of a lubricating circular path 29 which is defined hollowly inside of both input shafts 26, 27.

A spline connection portion is formed on the circumferential surface of the front-side input shaft 26.

In the front wall part of the case 25, an oil-pump-cover assembly 30 of an oil pump for supplying lubricating oil and operational oil is disposed such that the front-side input shaft 26 penetrates the middle thereof. In the oil-pump-cover assembly 30, an oil path 31 along which lubricating oil is supplied is formed such that lubricating oil is led into the case 25.

In the case 25, there is disposed a supporting member 32 which is fixed along the inner circumferential surface thereof. An oil path 32a used for a brake and an oil path 32b used for lubricating oil are formed in the supporting member 32.

Further, a cylindrical portion 32c is formed in the supporting member 32, and a spline portion 32d is formed in the circumferential part of the cylindrical portion 32c.

A 2-4 brake clutch 33 serving as a first multiplate engaging element is disposed in the case 25. Herein, the 2-4 brake clutch 33 is constituted of a brake piston 34 which is disposed slidably on the supporting member 32 by the compressed oil supplied path the brake oil path 32a, a multiplate clutch plate 35 which is engaged or disengaged by the pressure made by the brake piston 34, and a clutch drum 36.

The brake piston 34 is sealed on the inner and outer circumferential surfaces thereof by sealing portions 37, 37, and is always pressed by a spring member 38 in a direction in which its pressure is removed.

The multiplate clutch plate 35 is constructed by mounting alternately a plurality of driven plates 35a and a plurality of drive plates 35b.

The clutch drum 36 is held by the cylindrical portion 32c of the supporting member 32 which is inserted inside of the clutch drum 36 through the medium of a first radial bearing 39 from the inner part of the clutch drum 36 such that the clutch drum 36 is rotatable with respect to the inner circumferential surface of the cylindrical portion 32c.

The first radial bearing 39 is constructed to overlap with the multiplate clutch plate 35 in the axial direction.

The 2-4 brake clutch 33 is engaged in two of the forward gears and is disengaged by a forward gear between the two gears. As shown in FIG. 3, the 2-4 brake clutch 33 is constructed such that the multiplate clutch plate 35 of the 2-4 brake clutch 33 is pressed by the brake piston 34 in the axial direction so that the 2-4 brake clutch 33 is engaged by the second and fourth forward gears, and the pressure is removed so that the 2-4 brake clutch 33 is disengaged by the third forward gear.

A reverse clutch 40 serving as a second multiplate friction engaging element which uses the clutch drum 36 of the 2-4 brake clutch 33 as a clutch hub is disposed substantially in the same position as a position of the 2-4 brake clutch 33 in the axial direction and outside of the 2-4 brake clutch 33 in the radius direction.

A reverse clutch 40 is constituted of a cylindrical reverse clutch drum 41 which is disposed rotatably via the oil-pump-cover assembly 30 and a needle bearing 45 by the spline-connection with the front-side input shaft 26, a clutch piston 42 which is disposed slidably in the axial direction inside of the reverse clutch drum 41, a multiplate clutch plate 43 which is engaged and disengaged by the pressure of the clutch piston 42, and a cancel piston 44 for giving the cancel pressure by which the clutch piston 42 is pressed in a direction in which its pressure is removed.

The multiplate clutch plate 43 of the reverse clutch 40 is formed by piling alternately a plurality of driven plates 43a and a plurality of drive plates 43a.

An outside spline portion 36a defined in the outer circumference of the clutch drum 36 of the 2-4 brake clutch 33 in which the driven plates 43a... are disposed is constructed to overlap in the axial direction with an outside spline portion 36b defined in the inner circumference of the clutch drum 36 in which the drive plates 35b... of the 2-4 brake clutch 33 are disposed.

As shown in FIG. 3, the reverse clutch 40 is constructed to be engaged only at backward driving.

A part of the multiplate clutch plate 35 of the 2-4 brake clutch 33 in the first embodiment is disposed to overlap with a part of the multiplate clutch plate 43 of the reverse clutch 40 in the axial direction.

A front planetary gear device 46 used as one of planetary gear trains is disposed in the rear of the supporting member 32.

The front planetary gear device 46 is constituted mainly of a front sun gear 47 in the spline-connection with the clutch drum 36 of the 2-4 brake clutch 33, a front planetary carrier 49 which is held rotatably on the supporting member 32 via a second radial bearing 48, a pinion gear 50 which is held on the front planetary carrier 49 and is engaged with the front sun gear 47, and a front internal gear 51 which is engaged with the pinion gear 50.

The operation in the first embodiment will now be described.

Lubricating oil supplied from the side of the oil pump follows the lubricating circular path 29 in the input shaft 26 and is then supplied from the oil hole 28 to the 2-4 brake clutch 33, the reverse clutch 40, etc. In this operation, the lubricating oil lubricates and cools sufficiently the 2-4 brake clutch 33, which is engaged in two forward gears and is disengaged in the forward gear between the gears with high frequency of use, and thereafter lubricates and cools the reverse clutch 40 which is disposed substantially in the same position as that of the 2-4 brake clutch 33 in the axial direction and is disposed outside of the 2-4 brake clutch 33 in the radius direction.

Due to the supporting member 32, the 2-4 brake clutch 33 used with higher frequency can be disposed in the vicinity of the input shaft 26 which is a central axis of rotation and supplies lubricating oil. Accordingly, cooling lubrication is carried out by turns from the 2-4 brake clutch 33 by the use of the lubricating oil having a low oil temperature and a sufficient oil quantity before the diffusion caused by rotation.

Thereafter, the lubricating oil which has cooled sufficiently the 2-4 brake clutch 33 lubricates and cools the reverse clutch 40 which is disposed substantially in the same position as that of the 2-4 brake clutch 33 in the axial direction and outside of the 2-4 brake clutch 33 in the radius direction. Since the reverse clutch 40 is used with lower frequency than the 2-4 brake clutch 33 and since the 2-4 brake clutch 33 is not at work, as shown in FIG. 3, when driving backwards, the lubricating oil which has been discharged from the oil hole 28 reaches the reverse clutch 40 directly without raising its oil temperature. Therefore, lubricating and cooling operations can be improved.

Further, the clutch drum 36 of the 2-4 brake clutch 33 is used in common as a clutch hub in the reverse clutch 40. This arrangement results in the reduction of the number of assembly parts, thereby checking a raise in production costs and a rise in the weight of assembly products.

Moreover, since a band brake unit used conventionally can be omitted, a given space can be utilized efficiently.

The flow of operational oil will now be described. In the 2-4 brake clutch 33, at the forward driving, the brake piston 34 is slid in the axial direction and the 2-4 brake clutch 33 is pressed by the operational oil which is supplied from the brake oil path 32a formed by the supporting member 32, and thereby the 2-4 brake clutch 33 is engaged. However, the reverse clutch 40 is not supplied with the operational oil and is kept disengaged.

On the other hand, at the backward driving, the operational oil which is supplied from the brake oil path 32a formed by the supporting member 32 stops being supplied into the 2-4 brake clutch 33, and thereby the brake piston 34 is disengaged and pressed by the spring member 38 and thereafter restarts its sliding movement. As a result, the 2-4 brake clutch 33 is disengaged.

Therefore, at the backward driving, frictional heat is not generated by the multiplate clutch plate 35, and the reverse clutch 40 is supplied with lubricating oil having a low oil temperature. In addition, the reverse clutch 40 slides the clutch piston 42 in the axial direction and presses the multiplate clutch plate 43 with the operational oil which is supplied from the oil path 31, and the reverse clutch 40 is engaged. The engagement of the reverse clutch 40 allows an output shaft (not shown) to rotate reversely via the front planetary gear device 46 and the like. As described above, the reverse clutch 40 is not frequently engaged and disengaged, and therefore it is relatively easy to maintain the quantity of oil required for lubricating and cooling.

Thus, the 2-4 brake clutch 33 cannot be engaged at the same time that the reverse clutch 40 is engaged. Therefore, there is no fear that the shortage of lubricating oil used for lubricating and cooling will be caused by an increase in quantity of operational oil is increased or the lubricating oil will not reach all the parts resulting from the simultaneous engagement of the multiplate clutch plates 35, 43.

Besides, the reverse clutch 40 with relatively low frequency of use is disposed outside. Thus, while being diffused by the rotation, lubricating oil discharged from the oil hole 28 and the like lubricates and cools the 2-4 brake clutch 33 first, and then the quantity of lubricating oil according to the frequency of use is supplied in order to lubricate and cool the reverse clutch 40. As a result, the 2-4 brake clutch 33 and the reverse clutch 40 is lubricated and cooled with lubricating oil efficiently.

Therefore, different from a conventional construction in which a brake band 9 is fastened by a band servo device 10, there is no need to use friction materials superior in heat-resisting property for the sliding surfaces and the like of the brake band 9 and the drum 5 in this construction, and consequently production costs cannot be raised.

The 2-4 brake clutch 33 provided with the brake piston 34 functions as a multiplate brake device and presses the multiplate clutch plate 35 in the axial direction. Thereby, the 2-4 brake clutch 33 is engaged in a second forward gear and a fourth forward gear and is disengaged by a third forward gear, so that the shifting of a transmission state of driving force by four forward speeds and one reverse speed can be accomplished as shown in FIG. 3.

In the first embodiment, the cylindrical portion 32c of the supporting member 32 is used as a clutch hub of the 2-4 brake clutch 33, and the supporting member 32 is fixed on the side of the case 25 of the automatic transmission.

The driven plates 35a of the multiplate clutch plate 35 are disposed in the spline portion 32d of the cylindrical portion 32c of the supporting member 32. In addition, the clutch drum 36 in which the drive plates 35b confronting one another are disposed is held rotatably with respect to the inner circumferential surface of the cylindrical portion 32c of the supporting member 32 which is inserted inside of the clutch drum 36 through the medium of the first radial bearing 39 from the inner part of the clutch drum 36.

Moreover, the brake piston 34 is disposed slidably on the supporting member 32, and thereby the dispositional accuracy is enhanced and the amount of heat generated by rotational friction of the multiplate clutch plate 35 can be controlled.

Consequently, furthermore, the efficiency of lubricating and cooling the 2-4 brake clutch 33 and the reverse clutch 40 can be heightened, and an rise in the weight and a raise in the production costs can be checked.

The multiplate clutch plate 35 is constructed by mounting alternately the plurality of driven plates 35a and the plurality of drive plates 35b. Thereby, a larger superficial content of the surface for a sliding movement is realized, and a larger braking capacity can be designed.

The 2-4 brake clutch 33 is constructed such that a transmission state of driving force is shifted to realize a function of four forward speeds and one reverse speed, where the brake piston 34 disposed slidably on the supporting member 32 presses the multiplate clutch plate 35 in the axial direction, and thereby is engaged by the second forward gear and the fourth forward gear, and is disengaged by the third forward gear. Therefore, a brake band or a servo device, such as a conventional band brake device which is comparatively large, does not need to be used, and therefore the multiplate brake device can be disposed compactly inside of the reverse clutch 40.

Accordingly, the efficiency of utilizing a given space can be heightened.

The multiplate clutch plate 35 of the 2-4 brake clutch 33 is disposed overlapping with the multiplate clutch plate 43 of the reverse clutch 40 in the axial direction, so that the length of the apparatus in the axial direction can be shortened.

As a consequence, the efficiency of utilizing the given space can be heightened even more.

In the first embodiment, the first radial bearing 39 which is disposed inside of the clutch drum 36 is constructed to overlap with the multiplate clutch plate 35 in the axial direction so that the length of the clutch drum 36 in the axial direction can be shortened. The multiplate clutch plate 35 and the first radial bearing 39 are placed inside of the clutch drum 36 and, in addition, the first radial bearing 39 is held and, in addition, the cylindrical portion 32c of the supporting member 32 in which the spline portion 32d is formed is also inserted in the clutch drum 36. Thereby, the efficiency of utilizing the given space can be heightened.

The details of the first embodiment of the present invention was described above with reference to the attached drawings. However, the present invention is not limited to this embodiment. The present invention may be embodied in other modification without departing from the sprit or essential characteristics of the present invention.

In the first embodiment, for example, the 2-4 brake clutch 33 is used as a multiplate engaging element to be disposed inside. However, the present invention is not limited to this. For example, another multiplate clutch device, such as a high clutch device 7, a forward clutch device, an overrun clutch device, or a direct clutch device, may be used, as long as the reverse clutch 40 or the like which is disposed outside and has the higher frequency of use than that of a multiplate friction engaging element is used. A more beneficial effect will be obtained if a device used for the multiplate engaging element is not used simultaneously with a device used for the multiplate friction engaging element.

As mentioned above, according to an aspect of the present invention, for example, the first multiplate engaging elements, which are engaged by two gears on a forward side and are disengaged on the forward side between the two gears with high frequency of use, are disposed in the vicinity of the rotational central axis. Therefore, cooling lubrication with lubricating oil is first performed in the first multiplate engaging elements.

After that, the lubricating oil which has cooled sufficiently the first multiplate engaging elements lubricates and cools the second multiplate friction engaging elements which are disposed substantially in the same position as the position of the first multiplate engaging elements in the axial direction and outside of the first multiplate engaging elements in the radius direction.

Therefore, since the first multiplate engaging elements used with higher frequency are lubricated and cooled prior to the lubrication of the second multiplate friction engaging elements, cooling efficiency can be heightened.

According to another aspect of the present invention, the brake piston of the first multiplate engaging elements shifts the transmission state of driving force by engaging the multiplate clutch plates at the second forward gear and the fourth forward gear and disengaging them at the third forward gear. Therefore, four forward speeds and one reverse speed can be achieved.

For example, a clutch hub of the first multiplate engaging elements is fixed on the case side of an automatic transmission and a driven plate of the multiplate clutch plates is disposed on the case side thereof, or a clutch drum is held rotatably by a supporting member which is fixed on the case side thereof. Thereby, the dispositional accuracy is enhanced and thus the amount of heat generated by rotational friction can be controlled.

Consequently, the efficiency of lubricating and cooling the first and second multiplate engaging elements can be heightened even more, and an increase in the weight and a raise in the production costs can be checked.

In addition, a multiplate brake device is constructed such that the brake piston thereof shifts the transmission state of driving force in the axial direction by engaging the multiplate clutch plates at the second forward gear and the fourth forward gear and disengaging them at the third forward gear so as to achieve the four forward speeds and the reverse speed. Therefore, a brake band or a servo device, such as a conventional band brake device which is comparatively large in size, does not need to be used. Accordingly, the multiplate brake device can be disposed compactly inside of a second multiplate clutch device.

Accordingly, a given space can be utilized efficiently.

According to another aspect of the present invention, the clutch plates of the first multiplate engaging elements and the clutch plates of the second multiplate engaging elements are disposed overlapping with each other in the axial direction so that the length of a lubricating apparatus of the automatic transmission in the axial direction can be shortened.

As a consequence, the given space can be utilized more efficiently.

What is claimed is:

1. A structure of an automatic transmission wherein multiplate clutch plates of a plurality of multiplate engaging elements are engaged with or disengaged from each other by means of pistons each of which presses each of said multiplate clutch plates in an axial direction, thereby changing a rotational direction of a planetary gear train and changing a transmission state of driving force, said structure comprising:

a brake for forward movement, said brake serving as a first multiplate engaging element;

a brake piston provided in said brake, said brake piston serving to engage the multiplate clutch plates in second forward speed and fourth forward speed and disengage the multiplate clutch plates in backward speed and third forward speed;

a reversing clutch serving as a second multiplate engaging element; and a clutch piston provided in said reversing clutch, said clutch piston serving to engage multiplate clutch plates disposed axially overlapping with the multiplate clutch plates of said brake when moved backward and disengage the multiplate clutch plates axially disposed overlapping therewith when moved forward;

said reversing clutch being disposed substantially in the same position as that of said brake in the axial direction of said brake and outside of said brake in a radial direction thereof so that a transmission state of driving force is shifted to achieve four forward speeds and one backward speed.

* * * * *